(12) United States Patent
Nagata

(10) Patent No.: US 8,363,010 B2
(45) Date of Patent: Jan. 29, 2013

(54) OPERATING INPUT DEVICE FOR REDUCING INPUT ERROR

(75) Inventor: Takashi Nagata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 1349 days.

(21) Appl. No.: 12/076,757

(22) Filed: Mar. 21, 2008

(65) Prior Publication Data
US 2008/0231608 A1  Sep. 25, 2008

(30) Foreign Application Priority Data

Mar. 23, 2007 (JP) .................................. 2007-77330

(51) Int. Cl.
G09G 3/033 (2006.01)
(52) U.S. Cl. .......................... 345/158; 345/175; 345/157
(58) Field of Classification Search .......... 345/156–158, 345/173, 175
See application file for complete search history.

(56) References Cited

U.S. PATENT DOCUMENTS

| | | | | |
|---|---|---|---|---|
| 6,008,800 A | * | 12/1999 | Pryor | 345/173 |
| 6,144,366 A | | 11/2000 | Numazaki et al. | |
| 8,049,722 B2 | * | 11/2011 | Kumon | 345/158 |
| 2007/0230929 A1 | | 10/2007 | Niwa et al. | |
| 2007/0262965 A1 | * | 11/2007 | Hirai et al. | 345/173 |
| 2007/0262970 A1 | | 11/2007 | Matsumoto et al. | |
| 2008/0163131 A1 | | 7/2008 | Hirai et al. | |
| 2008/0211832 A1 | | 9/2008 | Kumon | |

FOREIGN PATENT DOCUMENTS

| | | |
|---|---|---|
| JP | A-S63-197211 | 8/1988 |
| JP | A-10-269012 | 10/1998 |
| JP | A-2000-006687 | 1/2000 |
| JP | A-2001-350576 | 12/2001 |
| WO | WO2007/029095 | * 3/2007 |

OTHER PUBLICATIONS

Office Action dated Feb. 3, 2009 in corresponding Japanese patent application No. 2007-077330 (and English translation).
Office Action mailed Jan. 24, 2012 in corresponding JP Application No. 2010-185233 (and English translation).

* cited by examiner

Primary Examiner — Seokyun Moon
(74) Attorney, Agent, or Firm — Posz Law Group, PLC

(57) ABSTRACT

An operating input device is provided in which input errors can be prevented. A finger area image is extracted from an image captured by a camera. A fingertip area is extracted from a difference image generated between the finger area image and a shifted image. A fingertip position is detected from the fingertip area based on a center of mass. A semitransparent fingertip image is superimposed on the menu image. Manual operation buttons coinciding with fingertip positions are displayed in an emphasized manner. An actual position of a finger press is shifted to coincide with a manual operation button position and the manual operation button is considered to be pressed.

4 Claims, 12 Drawing Sheets

TOUCH PANEL

DISPLAY SCREEN IMAGE
IN DISPLAY DEVICE

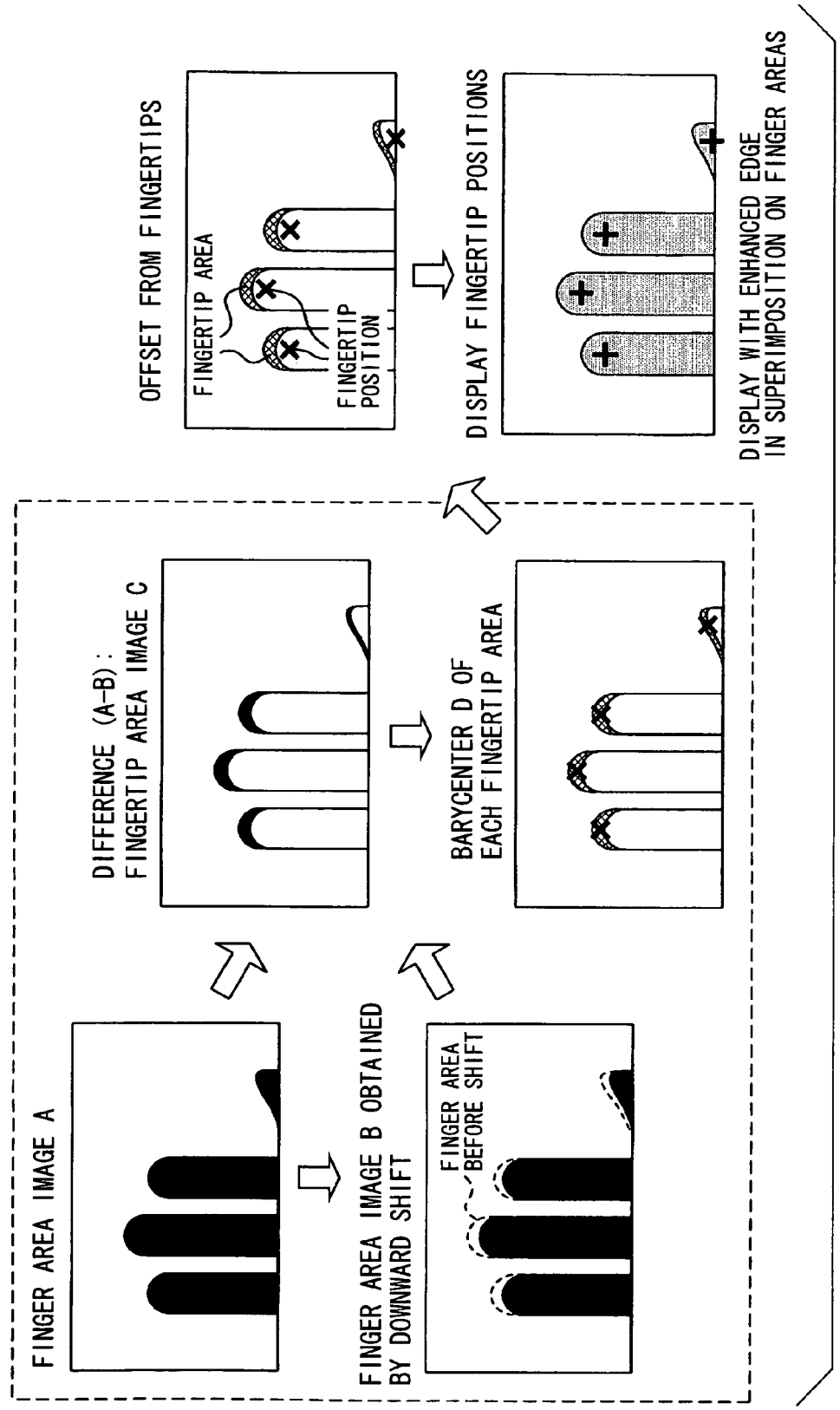

FINGERTIP AREA IMAGE D

OPERATING INPUT DEVICE FOR REDUCING INPUT ERROR

CROSS REFERENCE TO RELATED APPLICATIONS

The present invention is based on and claims priority to Japanese Patent Application No. JP 2007-077330 filed Mar. 23, 2007 the entire contents of which are incorporated herein by reference.

BACKGROUND OF THE INVENTION

1. Field of the Invention

The present invention relates to an operating input device for providing input using a touch panel and more specifically to an input device for reducing error.

2. Description of Related Art

Remote controllers are conventionally known for operating in-vehicle units such a car navigation system. However, remote controllers can be difficult to handle while driving. For example, a user is typically required to find a remote controller by fumbling through various portions of the passenger compartment, properly gain a hand hold, and then press the desired button to provide the desired input all without looking away from the road. Various techniques have been proposed to solve the problem of providing system input during driving.

For example, a technique is described in JP-A-10-269012 for detecting the approach of a hand to a touch panel by an infrared scanning mechanism provided at the upper part of the touch panel that uses infrared light. An operation menu is displayed and at the same time, an image of the hand over the touch panel is captured with a camera and the state of the operation is superimposed on the operation menu.

However, disadvantages arise in JP-A-10-269012 since it is difficult for an operator to accurately perceive the point of finger contact with the touch panel. In such a system, it is difficult to perceive what was actually input until the touch input is completed leading to input errors such as pressing a wrong button.

Further, a greater number of input options can lead to a greater chance for error. For example, performing a location search according to Japanese character input during the operation of a car navigation system involves many input buttons that are small in size. In such a case, it is more difficult to accurately position a fingertip on a button and an inputting error is more prone to occur.

SUMMARY OF THE INVENTION

In consideration of the foregoing disadvantages, it is an object of the invention to provide an operating input device to prevent input errors and facilitate input operation.

According to various embodiments, a signal from a touch panel for detecting a position of finger input and a signal from an imaging device for capturing an image of fingers over the touch panel are input to an exemplary operating input device. A menu displayed on a display device is operated based on the signal from the touch panel. The operating input device includes a finger area extraction unit that extracts a finger image area from an image captured by the imaging device, a fingertip position detection unit that detects a fingertip position based on the finger area image, an image synthesis unit that synthesizes the finger area image and a menu image displayed on the display device in a superimposed manner so that both the images are viewable, and an operation control unit that operates the menu image based on input to the touch panel. The operating input device obtains as a fingertip area an image equivalent to the difference between the finger area image and a shifted image obtained by shifting the finger area image toward the base of the fingers and a fingertip position relative to the fingertip area is extracted.

According to the above described aspect of the invention, an image associated with a difference between a finger area image and a shifted image obtained by shifting the finger area image toward the base of the fingers is obtained as a fingertip area and a fingertip position is extracted relative to the fingertip area. A fingertip position can be extracted from only an image of a fingertip.

When a fingertip position can be specified based on an image as mentioned above, it is possible to, for example, display the fingertip position and also display a manual operation button corresponding to the fingertip position in an emphasized manner. Therefore, even though it is difficult for an operator to perceive the precise point of finger contact on the touch panel, the operator can understand whether a manual operation button or the like is currently positionally engaged for operation based on the effective finger position by way of visual feedback provided by viewing the screen. The feedback has the effect of preventing input error resulting from pressing a wrong button.

With a fingertip position known through the above described feedback technique, the location of where finger press input will be registered is easily learned before finger press input is actually provided reducing the chance for error.

For example, a text search according to Japanese language characters in connection with the operation of a car navigation system involves many manual operation buttons that are small in size. In accordance with various embodiments, a fingertip and a manual operation button can be easily aligned with each other when the fingertip position is known as an image or image section.

It should be noted that the fingertip position as described herein refers to a position where a manual operation button or the like is considered by the operator to be operated by a fingertip on an operation screen such as a touch panel or touch sensitive screen in connection with, for example, selection of a menu image or operation of a virtual keypad underlying the touch sensitive screen as a series of button images. As described in greater detail hereinafter, the coordinates of the touch panel corresponding to the perceived fingertip position do not always correspond to the coordinates actually touched by a fingertip.

The fingertip position detection unit carries out contraction computation with respect to the fingertip area image to delete areas other than a fingertip. However, even when an image equivalent to the difference is obtained as described above, there is a possibility that if a finger is tilted or otherwise skewed, an area other than a fingertip can also be extracted as illustrated, for example, in FIG. 11. In such cases, contraction computation for deleting pixels in all the directions or in the horizontal direction, for example, is carried out to contract an image. Thus, a narrow image area, such as a lateral part of a finger, other than a fingertip area is deleted, and thus only a fingertip can be favorably extracted. The fingertip position detection unit further smoothes the fingertip area image to delete areas other than a fingertip.

When a finger is tilted as described above and the area other than a fingertip is extracted, a difference can be produced between an image signal of a fingertip portion, as expressed for example in pixel values, and an image signal of any other portion, a fingertip can be favorably extracted by removing portions of the image whose pixel value is equal to or higher than a predetermined value.

The fingertip position detection unit takes the barycenter or center of mass of the fingertip area as a basis for extracting a fingertip position.

The center of mass of a fingertip area can be supposed to be substantially in the center of the fingertip area corresponding to a fingertip position estimated to be present in the direction of the shift. Therefore, it is possible to set a fingertip position relative to the center of mass.

The fingertip position detection unit takes a position offset from the center of mass of the fingertip area toward the base of the fingers by a predetermined distance as a fingertip position.

As mentioned above, it is assumed that a fingertip position is present in the direction of the shift from the center of mass of the fingertip area in the direction of the base of fingers. Accordingly, a fingertip position can be set.

When a finger area is extracted by image pickup operation from the rear side of the touch panel, the fingertip position detection unit takes the coordinates of the lightest pixel or group of pixels in an area of the actual image of a finger that coincides with the fingertip area as a reference point for a fingertip position.

As an example, FIG. 13 illustrates a case where an illuminating apparatus and an image pickup apparatus are disposed under a touch panel and the positions of fingers are extracted from under the touch panel as described, for example, in Japanese Patent Application No. 2006-97923. In the above described case, the illuminating apparatus is positioned beneath. Therefore, the coordinates of the lightest pixel or pixels in an area of the actual image of a fingertip that coincides with a fingertip area can be assumed to be a portion close to the pad of the finger, that is, the portion of the finger having the highest likelihood of being brought into contact with the touch panel. Accordingly, these coordinates can be taken as a reference point for a fingertip position.

In accordance with various embodiments, a signal from a touch panel for detecting a position of finger input and a signal from an imaging device for capturing an image of fingers over the touch panel are input and a menu displayed on a display device is operated based on the signal from the touch panel. The operating input device includes a finger area extraction unit that extracts a finger area as an image from an image captured by the imaging device, a fingertip position detection unit that detects a fingertip position based on the finger area image, an image synthesis unit that synthesizes the finger area image and a menu image displayed on the display device so that both the images are viewable, and an operation control unit that operates the menu image based on input to the touch panel. The operating input device determines whether there is correspondence between the fingertip position and a manual operation button in the menu image. When there is predetermined correspondence, the manual operation button corresponding to the fingertip is displayed in an emphasized manner.

According to the above described aspect of the invention, it is determined whether there is correspondence such as a positional relation between a fingertip position and manual operation buttons in a menu image. A manual operation button corresponding to the fingertip is displayed in an emphasized manner.

Thus, the operator can clearly perceive which manual operation button can be operated based on the present fingertip position by way of displaying the manual operation button on the menu image in an emphasized manner without the need for being conscious about in which position on the touch panel his/her finger is placed. The above described perception provides visual feedback and makes it possible to prevent input errors.

The correspondence between a fingertip position and a manual operation button can be determined when the position of the fingertip position and the position of the manual operation button are aligned in more or less of a direct manner. However, it should be additionally noted that when a fingertip position is within a predetermined range from a manual operation button, it may be considered that the positions are aligned and the manual operation button may be displayed in an emphasized manner.

In some embodiments, the fingertip position is displayed over the menu image and the manual operation button in the menu image closest to the fingertip position is brought into correspondence with the fingertip position and displayed in an emphasized manner. Accordingly, it is possible to understand that the manual operation button displayed in the display screen image in an emphasized manner is in correspondence with the fingertip position and the manual operation button can be instantaneously activated without waiting for perfect correspondence between the fingertip and the manual operation button.

In accordance with various embodiments, only a manual operation button that accepts input is displayed in an emphasized manner. Displaying only a manual operation button that accepts input in an emphasized manner makes it possible to notify the operator of which manual operation button is available.

In accordance with various embodiments, the fingertip position is also displayed in superimposition on the finger area image. Such positioning makes it possible for the operator to learn the fingertip position and thus easily perceive in which direction the finger should be moved.

The display in an emphasized manner is carried out by changing the color of the manual operation button, changing the font of the text for the manual operation button, changing the width of the frame of the manual operation button, changing the state of the three-dimensional display of the manual operation button, partly or entirely changing the size of the manual operation button, causing the manual operation button to blink, or changing the brightness of manual operation buttons in accordance with the distance between the manual operation button and a fingertip, or some combination of the above effects.

An operating input device can be so constructed that a signal from a touch panel for detecting a position of finger input and a signal from an imaging device for capturing an image of fingers over the touch panel are input. A menu displayed on a display device is operated based on the signal from the touch panel. The operating input device includes a finger area extraction unit that extracts a finger area as an image from an image captured by the imaging device, a fingertip position detection unit that detects a fingertip position based on the finger area image, an image synthesis unit that synthesizes the finger area image and a menu image displayed on the display device in a superimposed manner so that both the images are viewable, and an operation control unit that operates the menu image based on input to the touch panel. With regard to the operating input device, the fingertip position is displayed over the menu image and when input to the touch panel is detected, processing is carried out to correct the detected input coordinates into the coordinates of a fingertip position in the display device in proximity to the input coordinates.

Coordinates in the touch panel and coordinates of a display screen image in the display device are in correspondence with each other. Therefore, when input coordinates in the touch panel are detected, the corresponding coordinates are also determined in the display screen image.

However, a fingertip position is displayed over a menu image and when finger press input to the touch panel is detected, the detected input coordinates are not taken as coordinates in the displayed image. Instead, they are corrected into the input coordinates associated with a displayed fingertip position in proximity to the coordinates in the display device. That is, when there is touch input, the input is considered to have been done at the coordinates of a displayed fingertip position, not at the coordinates actually detected in the touch panel. Accordingly, regardless of the input position in the touch panel, identifying which manual operation button is to be operated or was operated can be accomplished as long as a fingertip or fingertip position in a display screen image or a manual operation button that is displayed, for example, in an emphasized manner is recognized.

It should be noted that the above described correction processing is carried out when the input coordinates in the touch panel, such as the actual position of a finger press, are within a predetermined range from the coordinates of the fingertip position, such as less than or equal to a predetermined distance from the fingertip position. Thus, even when the input coordinates in the touch panel and the coordinates of the fingertip position are at some distance from each other, as long as there is correspondence between them, input associated with the manual operation button can be accomplished based on any detected input that corresponds to the fingertip position.

In connection with the above described embodiments, when input to the touch panel is detected, processing is carried out with the manual operation button displayed in an emphasized manner considered to have been operated. Accordingly, it is possible to carry out processing with a manual operation button considered to have been operated regardless of the input position in the touch panel. Therefore, the operator can pay attention to a display screen image only and can very easily perform operation.

In accordance with an operating input device so constructed, a signal from a touch panel for detecting a position of finger input and a signal from an imaging device for capturing an image of fingers over the touch panel can be input. A menu displayed on a display device is operated based on the signal from the touch panel. The operating input device includes a finger area extraction unit that extracts a finger area image from an image captured by the imaging device, a fingertip position detection unit that detects a fingertip position based on the finger area image, an image synthesis unit that synthesizes the finger area image and a menu image displayed on a display device in a superimposed manner so that both the images are viewable, and an operation control unit that operates the menu image based on input to the touch panel. The operating input device operates such that the fingertip position is displayed over the menu image. When the distance between a manual operation button in the menu image and the fingertip position is within a predetermined range and input to the touch panel is detected, processing is carried out with the manual operation button considered to have been operated.

According to the above described aspect of the invention, a fingertip position is displayed over a menu image and when the distance between a manual operation button in the menu image and the fingertip position is within a predetermined range such that, for example, they coincide and input to the touch panel detected, processing is carried out with the manual operation button considered to have been operated. Therefore, which manual operation button is to be operated can be identified based on visual feedback associated with the current position of the finger regardless of the actual input position in the touch panel as long as the positional relation between the displayed fingertip position and the manual operation button in the display screen image is recognized.

It should be incidentally noted an exemplary system configuration can include at least one of the touch panel, imaging device, and display device.

BRIEF DESCRIPTION OF THE DRAWINGS

Other objects, features and characteristics of the present invention will be appreciated and become apparent to those of ordinary skill in the art and all of which form a part of the present application. In the drawings:

FIG. 4 is a diagram illustrating an exemplary method for detecting a fingertip position;

DETAILED DESCRIPTION OF THE EXEMPLARY EMBODIMENTS

Description will now be given to various exemplary embodiments consistent with the invention.

First Embodiment

Figure 1:
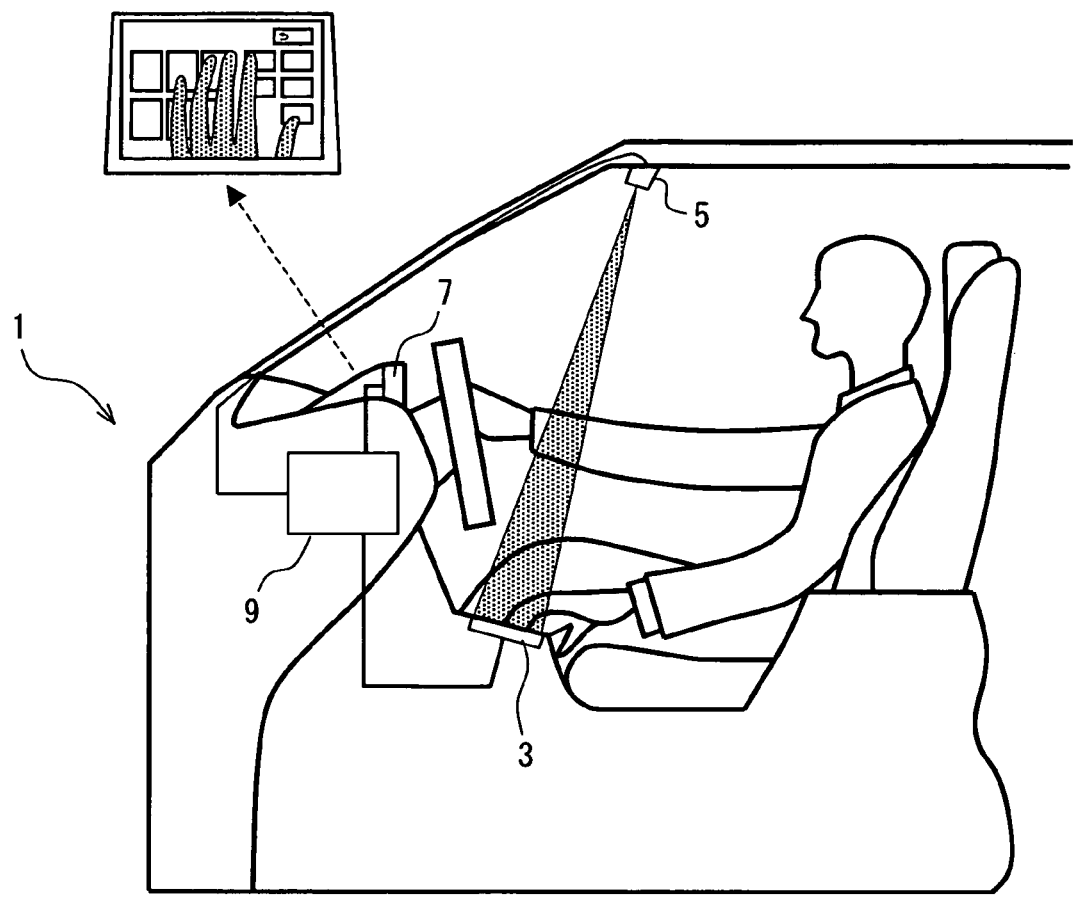
FIG. 1 is a diagram illustrating a configuration of an exemplary in-vehicle operating input device in a first embodiment.
Figure 2:
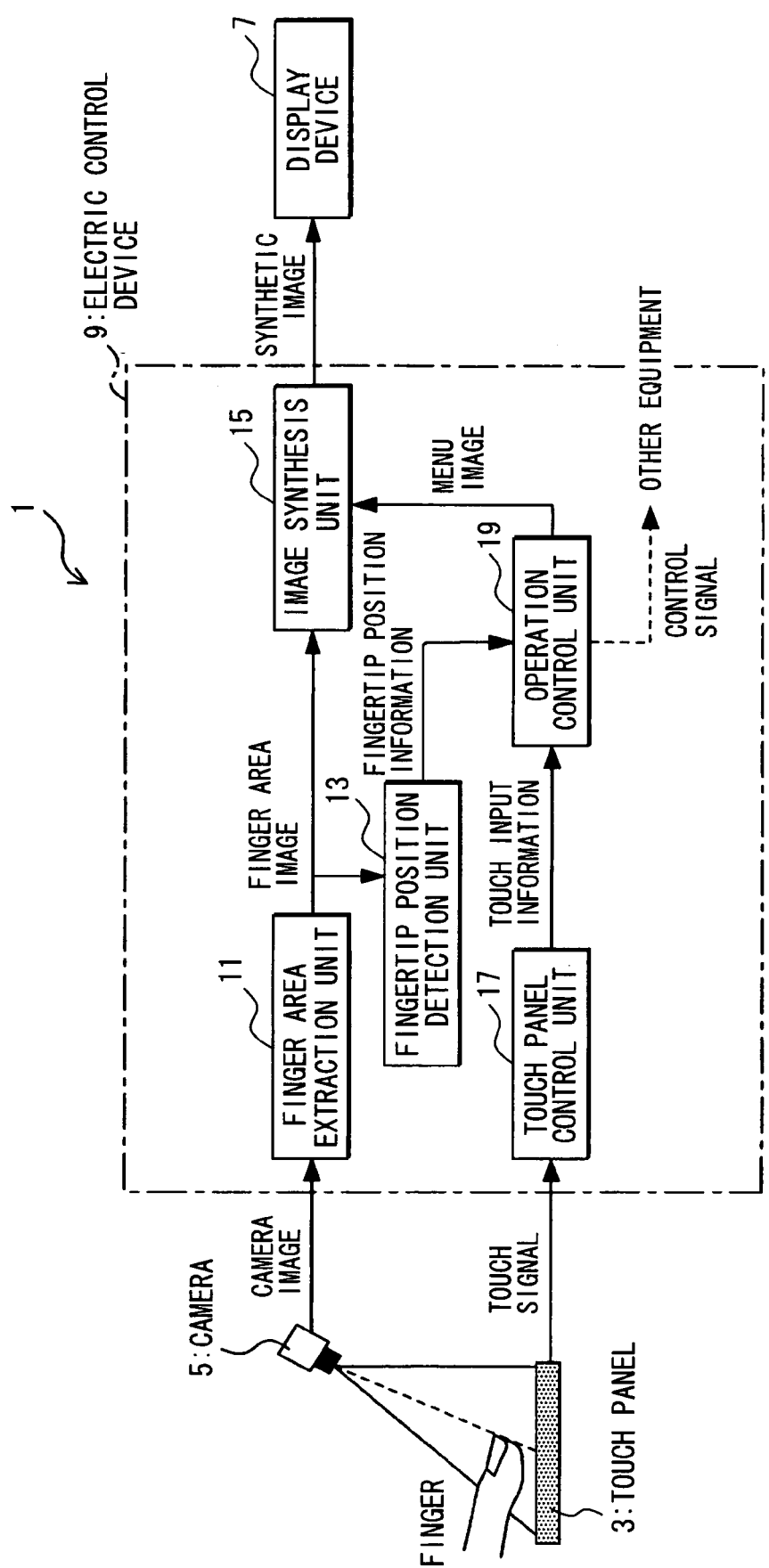
FIG. 2 is a block diagram illustrating a configuration of an exemplary operating input device.

In accordance with a first exemplary embodiment, for example, as illustrated in FIG. 1 and FIG. 2, the operating input device 1 can be used, for example, as an input device for a car navigation system. The operating input device 1 can include a touch panel 3, a camera 5 such as a video camera for capturing an image of the surface of the touch panel 3 from above, a display device 7 for displaying various objects including interactive objects such as a menu image, menu screen, manual operation buttons and the like, and an electronic control device 9 that can operate as a control unit for controlling the above described elements.

Figure 3A:
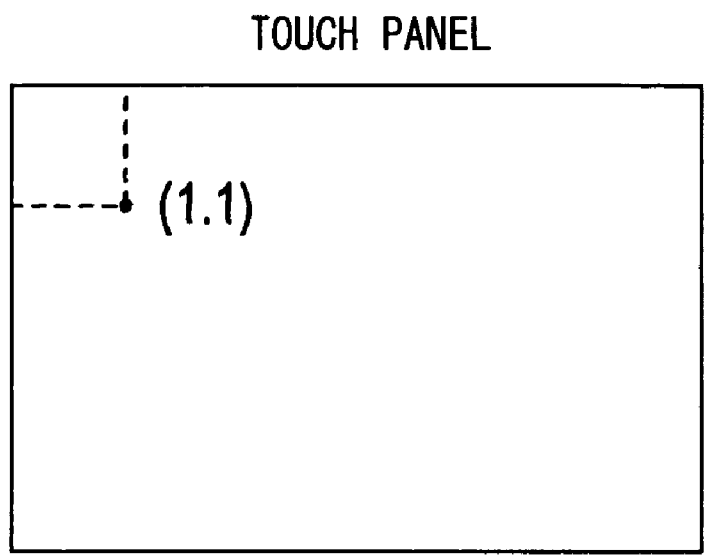
FIG. 3A and FIG. 3B are diagrams illustrating a relation between coordinates in a touch panel and in a display image in a display device.
Figure 3B:
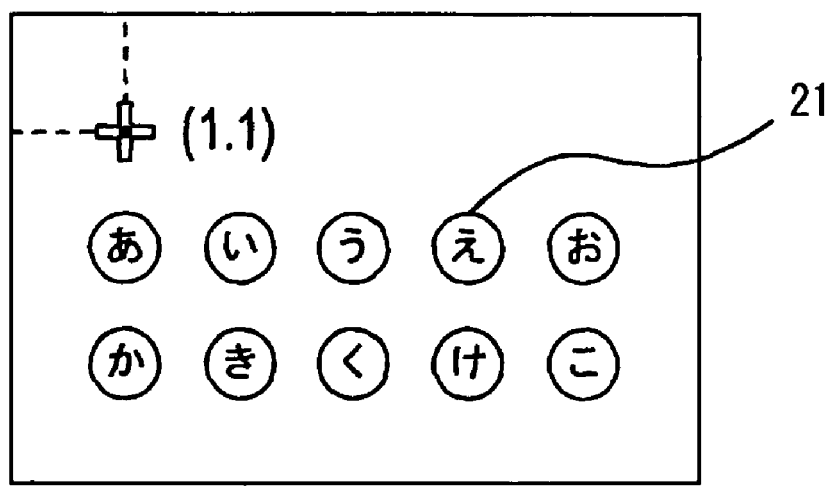

As illustrated in FIG. 3, X- and Y-coordinates are established in association with the touch panel 3 so that touched areas can be discriminated. X- and Y-coordinates are also established in association with display screen images. For example, a menu screen in which a menu image is displayed on the display device 7 can be associated with certain positions expressed in terms of X- and Y-coordinates.

Under normal conditions, for example, when the coordinates (1,1) are touched in the touch panel 3, processing related to the corresponding coordinates (1,1) such as processing for displaying a mark, can also be carried out in the display device 7.

The electronic control device 9 can be constructed of CPU, ROM, RAM, I/O, and the like, none of which is shown since well understood in the art. Signals such as touch signals indicating input coordinates from the touch panel 3 and image signals from the camera 5 are input to the electronic control device 9, which carries out processing for displaying an image on the display device 7, and processing for operating any other device based on the signals. The electronic control device 9 includes a finger area extraction unit 11 that extracts portions of fingers positioned on the touch panel 3 from a camera image forming the finger area image. A fingertip position detection unit 13 detects a fingertip position based on the finger area image. An image synthesis unit 15 superimposes the finger area image on a menu image displayed on the display device 7 and performs a synthesis such as semitransparent synthesis so that both of the images are viewable. A touch panel control unit is provided with signals input from the touch panel 3 and determines the coordinates associated with a position of the touch panel touched by a fingertip. An operation control unit 19 carries out varied processing based on information such as touch input information from the touch panel control unit 17 and information such as fingertip position information indicating a fingertip position.

As described in greater detail hereinafter, the operation control unit 19 carries out processing for indicating which menu item in a menu image such as which manual operation button 21 has been operated based on touch input information and fingertip position information. The operation control unit 19 further carries out processing associated with other functions, such as route search in a car navigation system, according to the operated manual operation button 21 and processing for controlling other equipment, such as an air conditioner, audio system and the like.

Characteristic processing can be carried out in the electronic control device 9 according to an exemplary method for detecting fingertip positions carried out in accordance with a flow of processing in the fingertip position detection unit 13. The processing can be used to detect multiple fingertips and, more specifically, fingertip positions, from an image captured by the camera 5. As shown in FIG. 4, a finger area image A is extracted from an image captured by the camera 5. The finger area image A is then moved toward the base of the fingers to generate a shifted image such as finger area image B.

The difference value A-B, between the finger area image A and the finger area image B is determined so as to generate a difference image such as a fingertip area image C. The center of mass D of the fingertip area of each fingertip is determined and a reference point for the center of mass is indicated by an "x" marking in the drawings.

The position downward by a given distance from each center of mass D by a predetermined amount is taken as a fingertip position indicated by a "+" marking in the drawings. The fingertip positions are thereby corrected to the vicinity of contact points in the touch panel 3. It should be noted that the contact points are portions of the touch panel 3 actually touched by a finger. The "+" marked fingertip positions are assigned in a downward position since there is a high probability that the touch panel 3 will be contacted or pressed by the most raised portion of the pad of the finger. The pad portion is assumed to be located at a predetermined distance from edge of the fingertip in a direction toward the base of the finger. Therefore, it will be understood that, while certain positions are shown in the drawings using an "x" or "+" to represent center of mass or assigned fingertip position or the like, the actual assigned fingertip location need not be so strictly limited and can deviate from such a position based on a variety of other factors, such as those that may take into account movement or the like.

An image of the fingertip areas such as a semitransparent image of modeled fingers whose edge is enhanced is displayed. At the same time, the fingertip positions are superimposed on the displayed image of the fingers. Therefore, visual feedback indicating by which portion of the finger a manual operation button 21 is to be operated can be shown to occupants in an easy-to-understand manner.

An exemplary method for displaying a manual operation button 21 in an emphasized manner is described in connection with FIG. 5. The manual operation button 21 has a position that that corresponds to the present fingertip position. Therefore, the emphasized display provides feedback to the operator that visually indicates either a confirmation that the intended manual operation button will be activated if a finger press is executed in the present position or will indicate which manual operation button or buttons 21 will be activated if a finger press is executed in the present position in the event the operator is unsure of the effect of the present finger position.

Figure 5A:
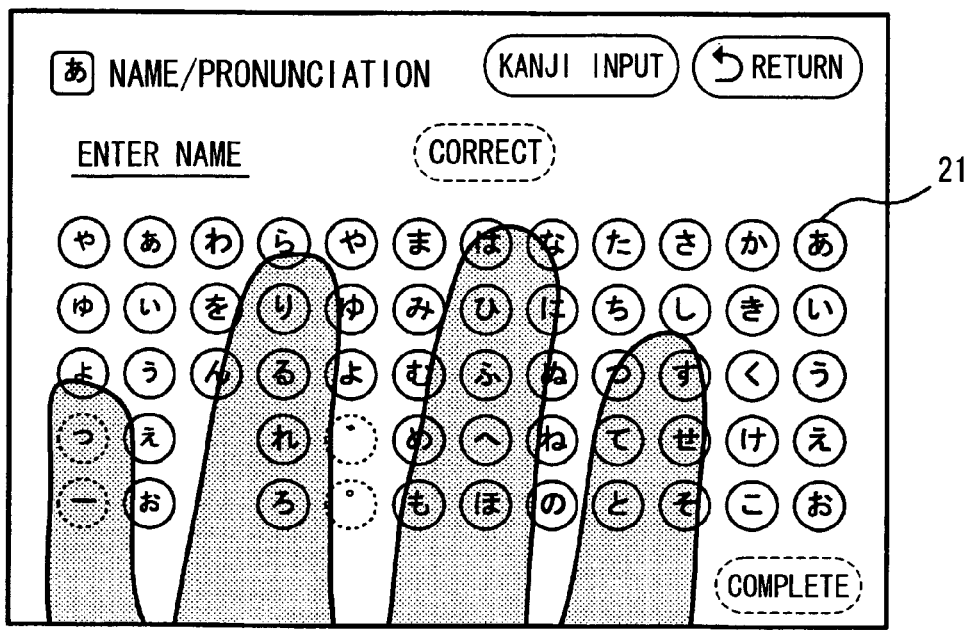
FIG. 5A is a diagram illustrating an exemplary display of manual operation button without emphasis.

In FIG. 5A a menu image and a semitransparent finger image, obtained by rendering finger area image A semitransparent, are superimposed on each other. In such a case, it is difficult to distinguish which manual operation button 21 is to be pressed based on the present finger positions.

Figure 5B:
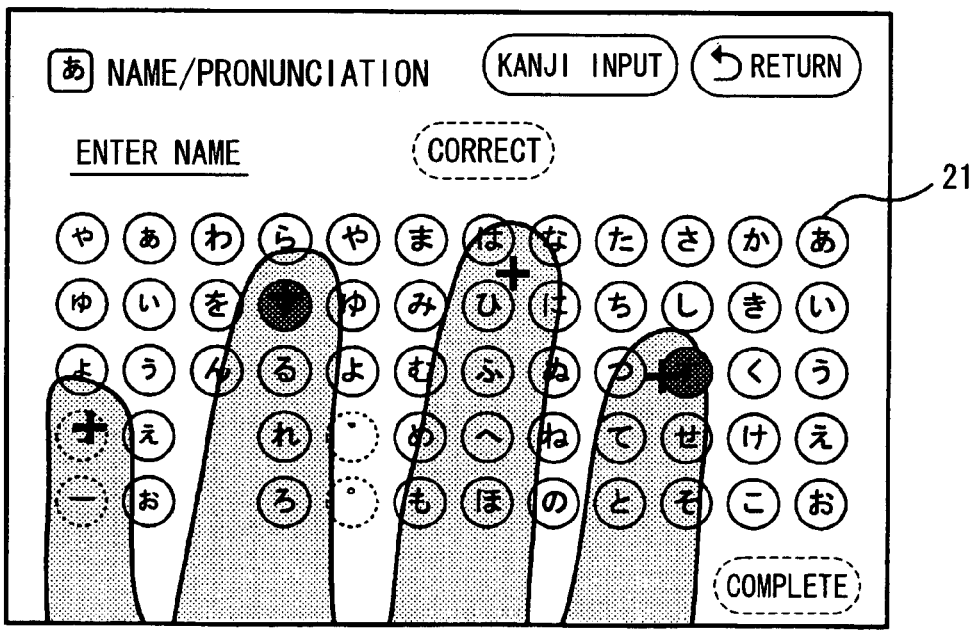
FIG. 5B is a diagram illustrating an exemplary display of manual operation button with emphasis.

In the present embodiment, the fingertip positions are indicated by + in superimposition on a semitransparent finger image as illustrated in FIG. 5B. When a fingertip position and a position associated with one of the manual operation buttons 21 coincide, the manual operation button 21 is displayed in an emphasized manner even though touch input has not yet been provided. In the present case, the manual operation button 21 is displayed in an emphasized manner as long as the image of a fingertip position and the image of the manual operation button 21 coincide. It should be noted that in the example of FIG. 5B, the Japanese character "つ" located at the lower left portion of the input section, is configured so as not to accept input in the present mode. Therefore, the "っ" button is not displayed in an emphasized manner even though a finger position coincides with the button position. Thus, the state of display can be changed when various buttons are configures so as not to accept input and on other like occasions.

Figure 6A:
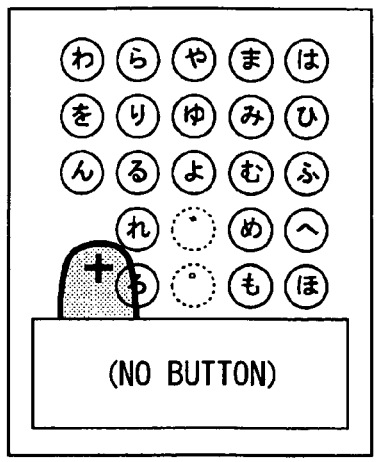
FIG. 6A is a diagram illustrating an exemplary change in the state of manual operation button display where no manual operation button display is emphasized.
Figure 6D:
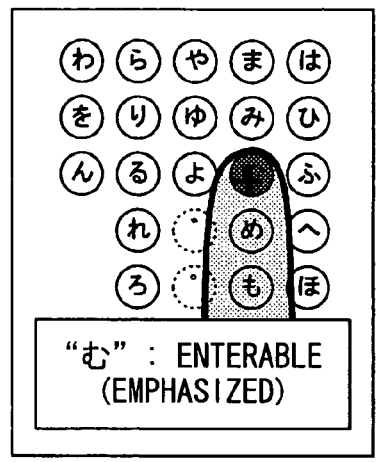
FIG. 6D is a diagram further illustrating an exemplary change in the state of manual operation button display where a manual operation button display is emphasized.
Figure 6B:
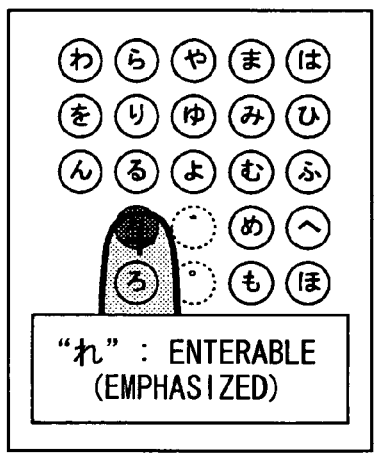
FIG. 6B is a diagram further illustrating an exemplary change in the state of manual operation button display where a manual operation button display is emphasized.
Figure 6E:
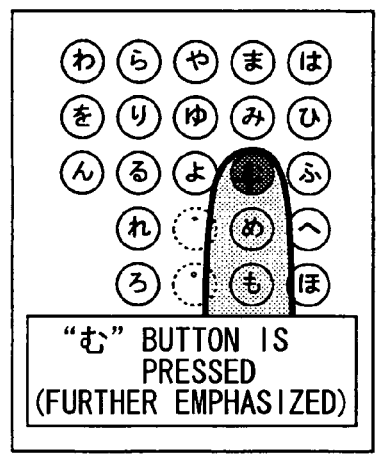
FIG. 6E is a diagram still further illustrating an exemplary change in the state of manual operation button display where a manual operation button display is pressed.
Figure 6C:
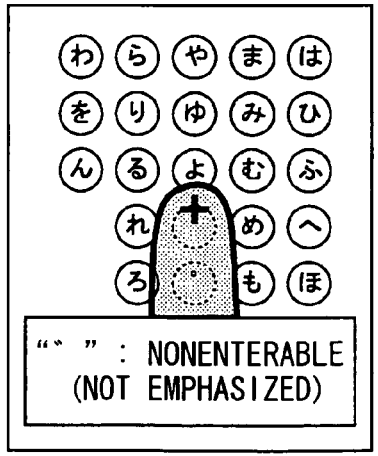
FIG. 6C is a diagram further illustrating an exemplary change in the state of manual operation button display where no manual operation button display is emphasized.

FIG. 6A illustrates a case where a fingertip position does not coincide of any manual operation buttons 21. In such a case, no manual operation button 21 is displayed in an emphasized manner. In FIG. 6B a fingertip position coincides with a manual operation button 21 of the Japanese character "れ," making "れ," enterable. Therefore, since a press of the finger in the present position will activate entry of the "れ," character, the manual operation button 21 of "れ," is displayed in an emphasized manner. FIG. 6C illustrates a case where a fingertip position coincides with a manual operation button 21 of the Japanese mark " ゛ ," indicating a voiced sound. In this case, for various reasons, the mark " ゛ ," is nonenterable and therefore the manual operation button 21 of " ゛ ," is not displayed in an emphasized manner. FIG. 6D illustrates a case where a fingertip position coincides with a manual operation button 21 of a Japanese character "む." In such a case, since "む." is enterable the manual operation button 21 of "む." is displayed in an emphasized manner. FIG. 6E illustrates a case where the manual operation button of "む." is considered to have been actually pressed. In such a case, "む." is displayed in a further emphasized manner.

It will be appreciated that in a case of pen-based input, where input is done by a pointed object such as a pen nib or stylus, input to the touch panel 3 can be done with high accuracy. In case of fingertip input, input is done by plane by the pad of a finger or the like and coordinates detected in the touch panel 3 vary.

Figure 7A:
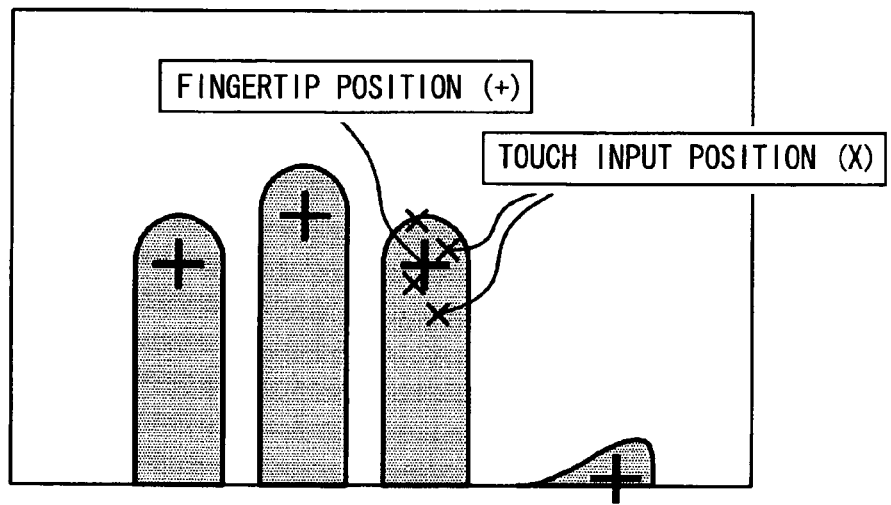
FIG. 7A is a diagram illustrating an exemplary method for correcting a fingertip position.
Figure 7B:
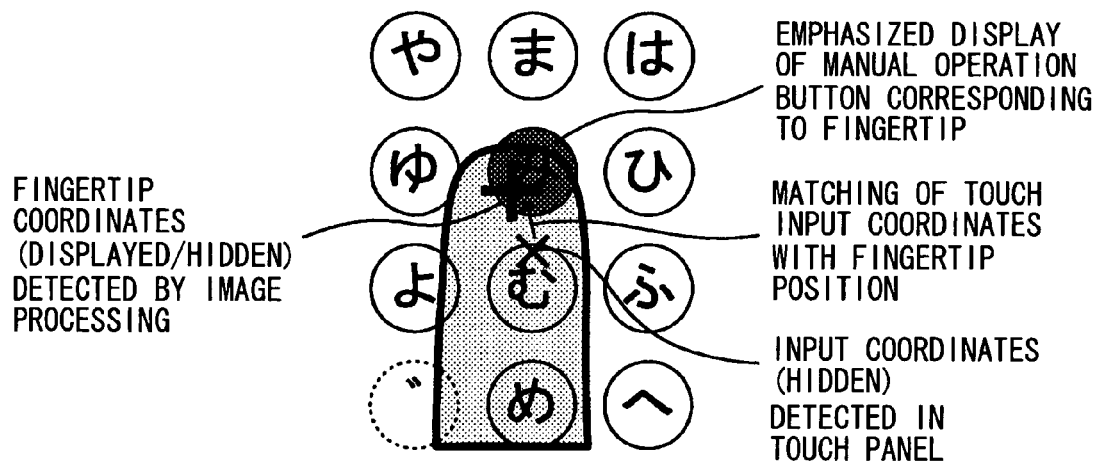
FIG. 7B is a diagram further illustrating an exemplary method for correcting a fingertip position.

In the present embodiment, coordinates detected in the touch panel 3 are matched with a fingertip position detected from an image. That is, when there is tactile input to the touch panel 3, processing is carried out with the tactile input considered to have been performed at the coordinates of a fingertip position associated with the fingertip image, not at the actual coordinates in the touch panel 3 of the tactile input. Even when fingertip positions are located as indicated by +, the actual touch positions deviate as indicated by X, in FIG. 7A. Thus, when input coordinates detected in the touch panel 3 are indicated by X, as illustrated FIG. 7B, processing is carried out with the coordinates of the fingertip position indicated by + taken as input coordinates.

Figure 8:
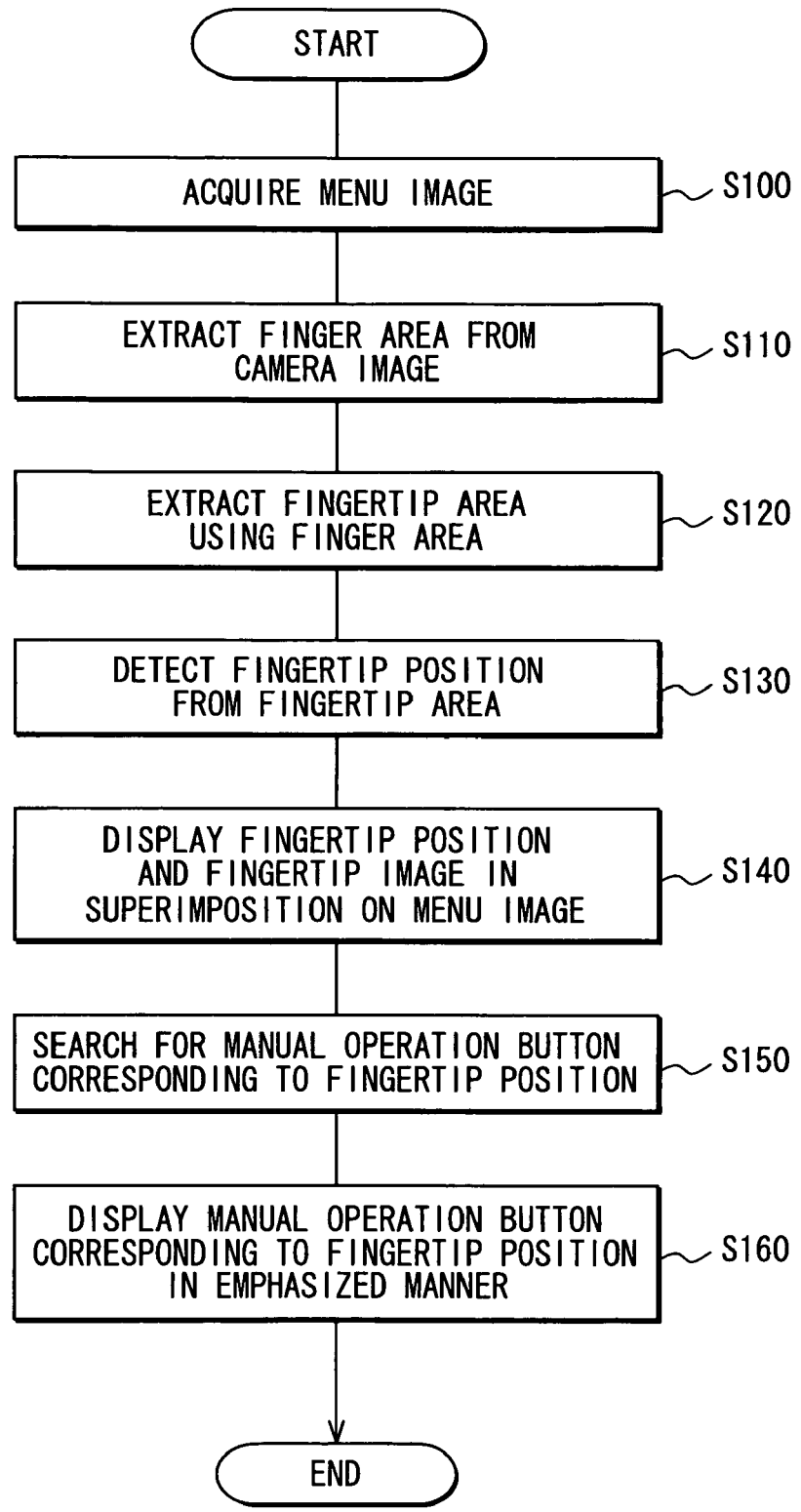
FIG. 8 is a flowchart illustrating an exemplary flow of processing for displaying a menu image.

The details of processing carried out at the electronic control device 9 are described with reference to an exemplary flowchart as shown in FIG. 8. A menu image is acquired from, for example, a ROM at S100 whereupon the menu image may be displayed on the display device 7. It should be noted that the processing of S100 and display on the display device 7 must be carried out before 140 and 160 only and need not necessarily be carried out before S110, where a finger area is extracted from a camera image.

At S120, a fingertip area is extracted by the above-mentioned technique using a difference image generated by shifting the finger area as described above. At S130, a fingertip position is detected from the fingertip area by the above-mentioned technique using a center of mass and an offset therefrom as described. At S140, the fingertip position is displayed over the menu image. At the same time, a semi-transparent fingertip image is superimposed on the menu image. The processing of S140 may be carried out after S150 or S160.

At S150, subsequently, a manual operation button 21 corresponding to or otherwise coinciding with each fingertip position is searched for. Even when the fingertip position and the position of the manual operation button 21 do not exactly coincide with each other, they can be considered to coincide for the purpose of emphasis as long as the fingertip position is within a predetermined range from the manual operation button 21 such as within a predetermined range from the center of or from the periphery of the manual operation button 21. The processing of S150 may be carried out between S130 and S140.

At S160, the manual operation button 21 corresponding to the fingertip position is displayed in an emphasized manner. Thereafter, the series of processing routines is terminated or can continue to cycle until a new input sequence is processed. It should be noted that the order of the above described routines may be changed or may be carried out in parallel as long as the processing of S120 is carried out after S110, the processing of S130 is carried out after S120, the processing of S140 is carried out after S130, the processing of S150 is carried out after S130, and the processing of S160 should be carried out after S150.

Figure 9:
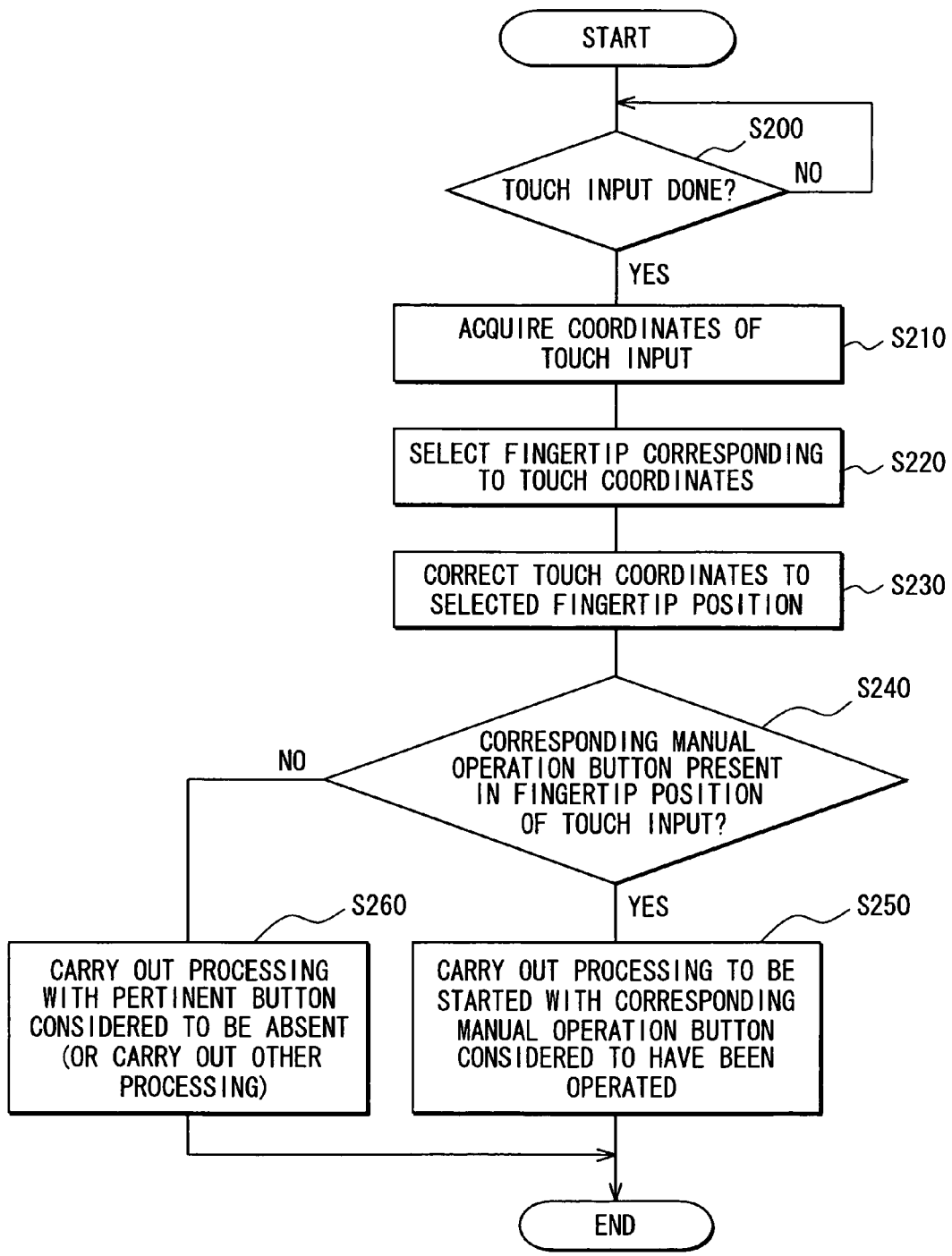
FIG. 9 is a flowchart illustrating an exemplary flow of processing corresponding to touch input.

Processing related to operating input with touch panel 3, as shown in FIG. 9, includes determining at S200 whether input to the touch panel 3 has been provided by, for example, a finger press or the like. If so, corresponding to YES at S200, coordinates corresponding to the position of the touch input are acquired at S210.

At S220, a fingertip corresponding to the touch coordinates is selected. For example, a fingertip having a position closest to the touch coordinates is selected as the fingertip associated with the detected touch input. At S230, the touch coordinates are corrected to correspond to the position of the selected fingertip. That is, regardless of the actual position of the touch input, processing is carried as if the touch input was received at the coordinates of the fingertip position.

If a corresponding manual operation button 21 coincides with the fingertip position where touch input is considered to have been done, corresponding to YES at S240, the flow proceeds to S250. If there is no correspondence between the corrected touch input position and a manual operation button 21, corresponding to NO at S240, the flow proceeds to S260.

Since, at S250, the corrected fingertip position and the position of the manual operation button 21 are considered to coincide, required processing is carried out with the manual operation button 21 considered to have been operated. For example, a character of "あ" or "い," is inputted, or route search in the car navigation system is carried out. At S260, no processing is carried out because the fingertip position and the position of the manual operation button 21 do not coincide. Alternatively, preset varied processing is carried out such as, for example, scrolling of a map.

Figure 10:
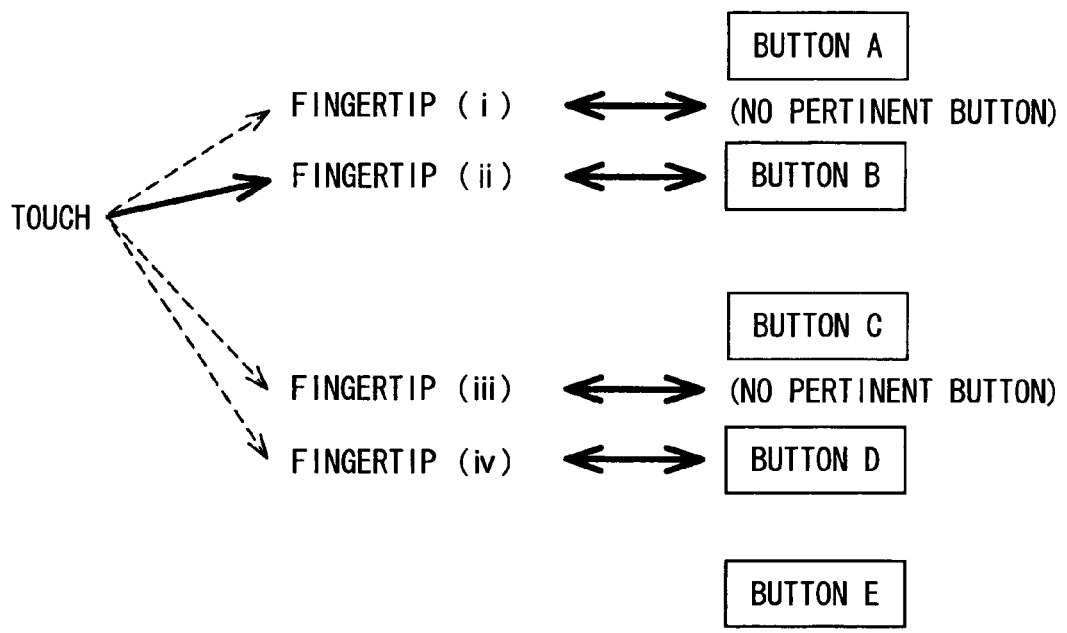
FIG. 10 is a diagram illustrating an exemplary relation between touch input, finger position, and manual operation buttons.

As an example of the relation between touch input, fingertip position, and manual operation buttons 21, it will be assumed that fingertips (i), (ii), (iii), and (iv), as illustrated in FIG. 10, are displayed in a menu image along with buttons A, B, C, D, and E, which can be manual operation buttons 21. When a touch is detected, the fingertip (ii) closest to the coordinates of the touch is selected. When the fingertip (ii) and the manual operation button (B) coincide, as shown in the figure, it is determined that the manual operation button (B) has been pressed by the fingertip (ii). As also shown, the fingertip (i) and the fingertip (iii) do not have a pertinent manual operation button 21. The fingertip (iv) has a pertinent manual operation button (D), that is, a button having a position that coincides with a fingertip position, but the position is far from the coordinate position of the detected touch. Therefore, these fingertips are not selected.

In the present embodiment, as mentioned above, a fingertip image extracted from a camera image is displayed as a semi-transparent image superimposed on a menu image. Therefore, an occupant can easily learn which manual operation button 21 is to be operated by a finger press.

When a finger comes close to or coincides with a manual operation button 21, this manual operation button 21 is displayed in an emphasized manner. Therefore, which manual operation button 21 is to be operated can be easily learned even when the manual operation button 21 is small in size. When a finger is brought into contact with the touch panel 3 with a manual operation button 21 displayed in an emphasized manner, even though the position of the finger is somewhat deviated, the manual operation button 21 displayed in an emphasized manner is considered to have been pressed, producing a remarkable effect of reducing errors to an extremely rare occurrence. That is, the operating input device 1 in the present embodiment produces a remarkable effect in that an occupant can instantaneously perceive a manual operation button 21 with which input can be done by each finger, and input can be reliably performed with an intended manual operation button 21 without being influenced by variation in input coordinates due to pressing a wrong button in the touch panel 3.

Second Embodiment

An operating input device in accordance with a second embodiment will be described herein below. It will be understood that description of elements or procedures that are the same as in the first embodiment will be omitted for simplicity.

Figure 11:
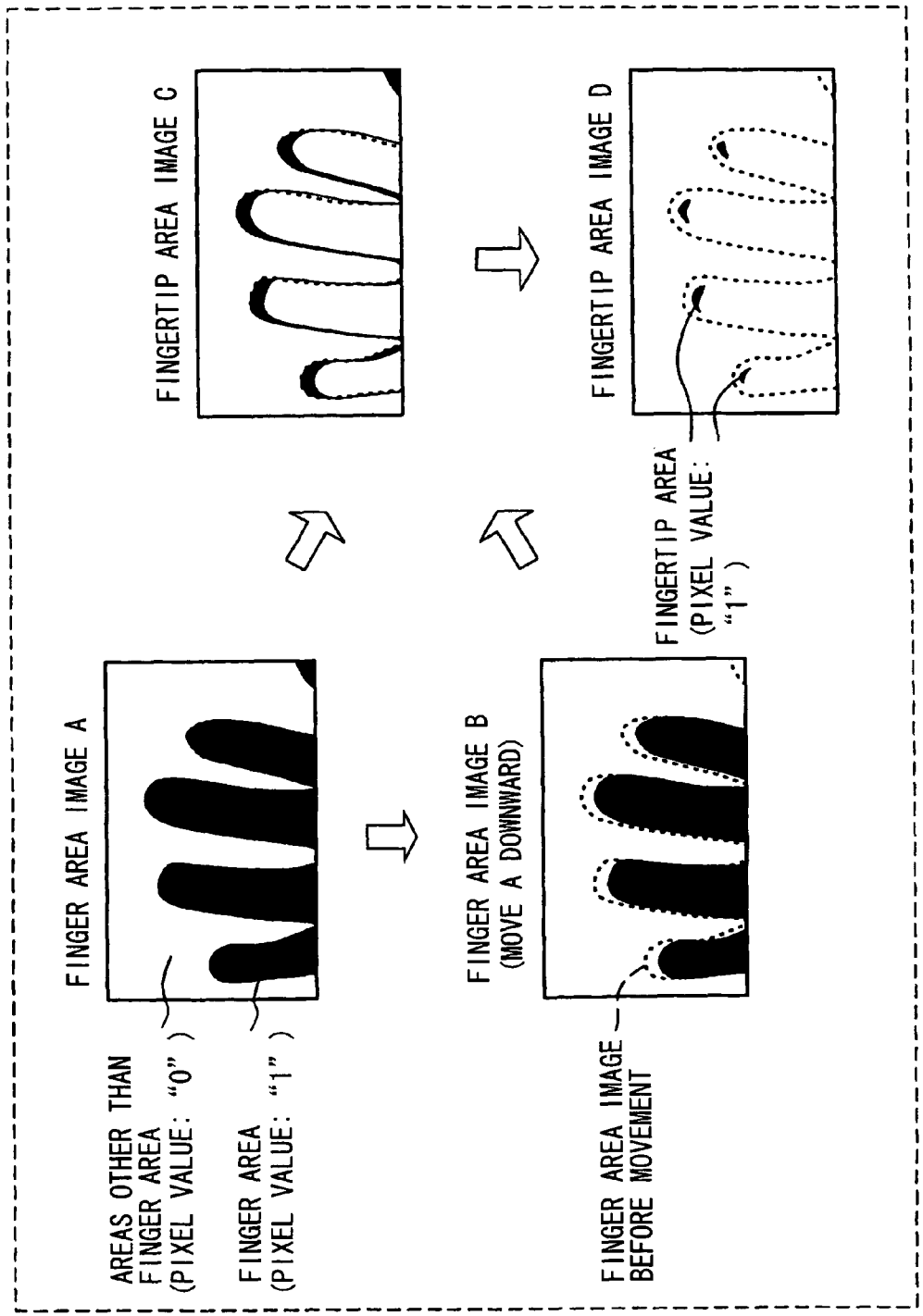
FIG. 11 is a diagram illustrating an exemplary method for extracting a fingertip area in a second embodiment.

The present embodiment includes a method for extracting a fingertip area. As illustrated in FIG. 11, a finger area image A is extracted as a binary image from a camera image. The finger area image A is moved or shifted downward toward the base of the fingers to generate a shifted image shown as finger area image B.

Subsequently, the difference between the finger area image A and the finger area image B, finger area image A-finger area image B, is determined to generate a difference image referred to as fingertip area image C. When a finger is in a position such as inclined and the difference is determined to be negative, the difference value is processed as a zero value.

Figure 12:
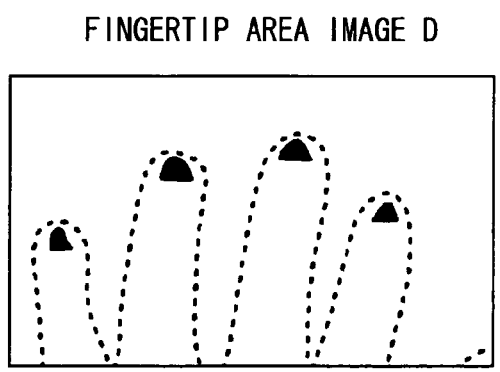
FIG. 12 is a diagram illustrating an alternative exemplary method for extracting a fingertip area in a second embodiment.

The fingertip area image C is contracted to generate a fingertip area image D. In the present example, the fingertip area image C is contracted, for example, in all directions such as in the horizontal direction and in the vertical direction. Specifically, several pixels are deleted inward of the fingertip area image C in the horizontal direction and in the vertical direction. Thereafter, the center of mass D of the fingertip area of each fingertip is determined and a position a given distance downward from each center of mass D is taken as a fingertip position as described in connection with in the first embodiment. In the present embodiment, since the difference image is contracted, difference areas other than fingertips can be deleted. Especially, when a finger is inclined, a fingertip area can be favorably extracted. Alternatively, the difference image may be contracted only in the horizontal direction as illustrated, for example, in FIG. 12. Or, the difference image may be smoothed and an area having a predetermined or higher pixel value is extracted from the smoothed image as a fingertip area.

Other Embodiments

Description has been given to first and second embodiments and various alternative embodiments of the invention. However, the invention is not limited to the above described embodiments and can be variously embodied.

Figure 13:
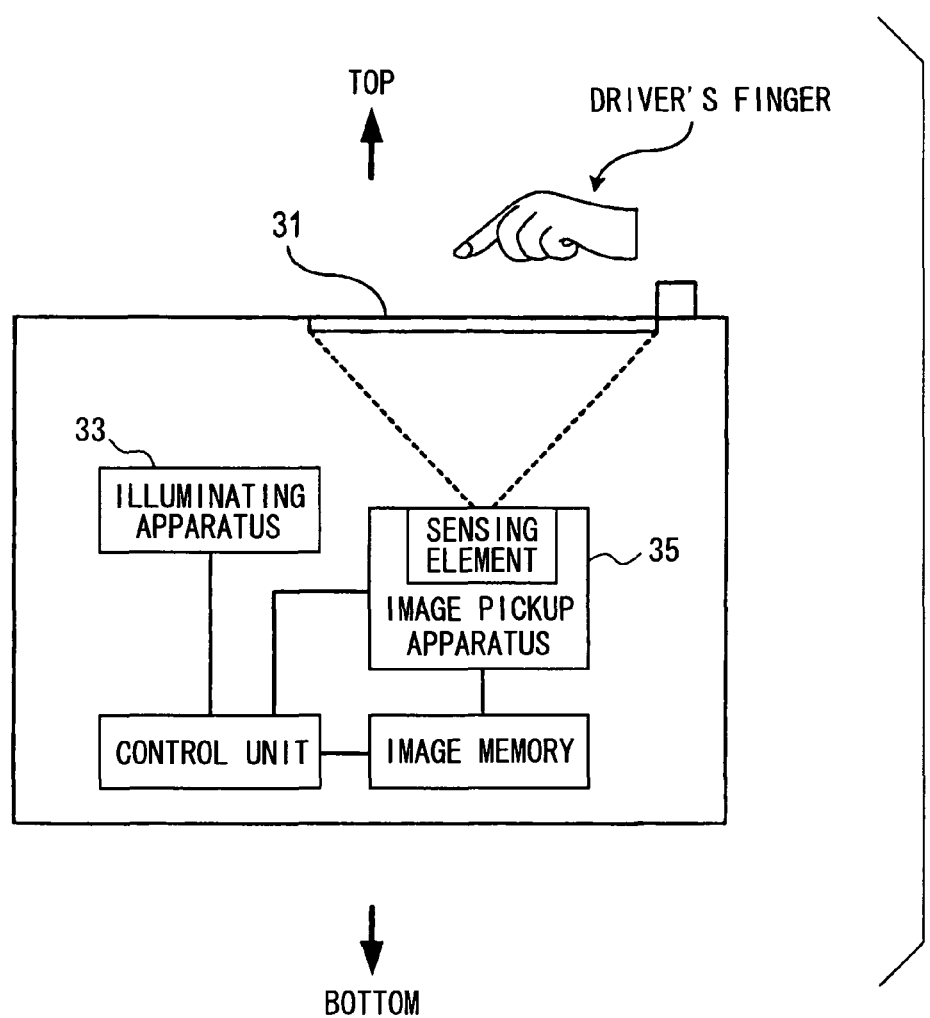
FIG. 13 is a diagram illustrating an exemplary apparatus capturing an image of fingers from under a touch panel.

For example, in the above embodiments, an image is captured from above by a camera to extract a finger area in connection with a touch panel. In alternative exemplary embodiments, image capture may be conducted from below as disclosed in Japanese Patent Application No. 2006-97923, for example as shown in FIG. 13. In such a case, an illuminating apparatus 33 and an image pickup apparatus 35 are disposed under a touch panel 31, and the position of a finger is extracted from under the touch panel 31. When a fingertip position is detected, therefore, the coordinates of a lightest pixel in an area of the actual image of a fingertip agreeing with a fingertip area can be taken as a reference point for the fingertip position. The coordinates of the lightest pixel are coordinates supposed to be close to the pad of a finger.

In other alternative exemplary embodiments, the invention is applicable not only to the operation of a manual operation button in a touch panel but also to, for example, scrolling of a map screen in which input is done based on an arbitrary position and the like.

In still other alternative exemplary embodiments, the invention is further applicable not only to in-vehicle navigation systems or the like but also to various operating input devices that are not equipped in a vehicle.

Still further, any method for display in an emphasized manner can be adopted as long as the display is emphasized after the above described operation is performed. For example, emphasis can be provided by changing the color of a manual operation button, changing the font of the text for a manual operation button, changing the width of the frame of a manual operation button, changing the state of the three-dimensional display of a manual operation button, partly or entirely changing the size of a manual operation button, causing a manual operation button to blink, changing the brightness of manual operation buttons in accordance with the distance between each manual operation button and a fingertip, and any combination of the above described methods of highlighting.

It should lastly be noted that, while the examples used in the present specification are based on Japanese language characters, the present invention is not limited to characters of a particular language or system. The manual operation button 21, can represent characters, numbers or any selection or configuration criteria. Specifically, the content or meaning of the manual operation buttons 21 is of less importance, since the invention is drawn generally to exemplary operation of the manual operation button 21 in connection with finger position and related processing. And as previously noted, the manual operation button need not be a button, but can be a menu item, an icon, a cursor or simply can be an area of a map or background display or the like.

What is claimed is:

1. An input device receiving a first signal from a touch panel indicating an actual input position of a finger press and a second signal from an imaging device for capturing an image of the finger on the touch panel, the first and second signal used to reduce input errors based on visual feedback provided on a display, the input device comprising:
   a finger area extraction unit for extracting a finger area image from an image captured by the imaging device;
   a fingertip position detection unit for detecting a fingertip position of the finger based on the finger area image; and
   an image synthesis unit for synthesizing the finger area image and superimposing the finger area image on a menu image, the finger area image and the menu image displayed such that both the finger area image and the menu image are viewable on the display, wherein the fingertip position detection unit obtains a finger-tip only image separated from a shifted image as a difference between the finger area image and the shifted image obtained by shifting the finger area image toward the base of fingers and extracts a fingertip position relative to a fingertip area image, wherein the fingertip position detection unit detects the fingertip position based on a center of mass of the fingertip area image, wherein the fingertip position detection unit detects the fingertip position based on a position associated with the fingertip area image that is shifted by a predetermined distance from the center of mass toward the base of fingers.

2. The operating input device of claim 1,
wherein the fingertip position detection unit carries out a contraction computation on the fingertip area image to delete portions of the fingertip area image that do not correspond to a fingertip.

3. The operating input device of claim 1,
wherein the fingertip position detection unit smoothes the fingertip area image to delete portions thereof that do not correspond to a fingertip.

4. The operating input device of claim 1,
wherein the captured image is captured by the imaging device from a backside of the touch panel, the fingertip position detection unit establishing as a reference point for the fingertip position, coordinates of a lightest pixel in the fingertip area image.

* * * * *